US008725711B2

(12) United States Patent
O'Reilly et al.

(10) Patent No.: US 8,725,711 B2
(45) Date of Patent: May 13, 2014

(54) SYSTEMS AND METHODS FOR INFORMATION CATEGORIZATION

(75) Inventors: Daniel F. Xavier O'Reilly, Bedford, MA (US); Nader Akhnoukh, San Francisco, CA (US); John Fawcett, Jr., Dover, MA (US); Daniel Dias, Boston, MA (US)

(73) Assignee: Advent Software, Inc., San Francisco, CA (US)

( * ) Notice: Subject to any disclaimer, the term of this patent is extended or adjusted under 35 U.S.C. 154(b) by 1539 days.

(21) Appl. No.: 11/760,371

(22) Filed: Jun. 8, 2007

(65) Prior Publication Data
US 2008/0140684 A1 Jun. 12, 2008

Related U.S. Application Data

(60) Provisional application No. 60/812,278, filed on Jun. 9, 2006.

(51) Int. Cl.
*G06F 17/30* (2006.01)

(52) U.S. Cl.
USPC .......................................................... 707/706

(58) Field of Classification Search
CPC .................... G06F 17/30386; G06F 17/30247; G06F 17/30604
See application file for complete search history.

(56) References Cited

U.S. PATENT DOCUMENTS

| 6,353,825 B1 * | 3/2002 | Ponte ................................. 707/5 |
| 2005/0108262 A1 * | 5/2005 | Fawcett et al. ................. 707/100 |
| 2005/0131935 A1 * | 6/2005 | O'Leary et al. ............... 707/102 |
| 2005/0204001 A1 * | 9/2005 | Stein et al. ..................... 709/206 |
| 2007/0112756 A1 | 5/2007 | Wen et al. |
| 2007/0118498 A1 | 5/2007 | Song et al. |

FOREIGN PATENT DOCUMENTS

WO    WO-2005050491    6/2005

OTHER PUBLICATIONS

International Search Report for PCT/US2007/013575, dated Nov. 26, 2007 (6 pages).
Written Opinion of the International Searching Authority for PCT/US2001/013575 (5 pages).
Wasson, Mark "Large-scale Controlled Vocabulary Indexing for Named Entities", Proceedings of the Sixth Conference on applied Natural Language Processing, Apr. 29, 2000, May 4, 2000 (pp. 276-281).
McCallum, A Information Extraction: distilling structured data from unstructured text:, ACM Queue ACM USA, vol. 3, No. 9, Nov. 2005 (pp. 48-57).

* cited by examiner

*Primary Examiner* — Yuk Ting Choi
(74) *Attorney, Agent, or Firm* — Goodwin Procter LLP

(57) ABSTRACT

This invention relates to a computer-based method and system for facilitating the classification of information items. Information items are searched for references to entities of interest, and associated with such entities based on calculated confidence levels that the information items contains a reference to the entities and a category confidence level that the information items relate to the entities.

28 Claims, 6 Drawing Sheets

SYSTEMS AND METHODS FOR INFORMATION CATEGORIZATION

CROSS-REFERENCE TO RELATED APPLICATIONS

This application claims priority to and the benefits of U.S. provisional patent application Ser. No. 60/812,278, filed Jun. 9, 2006, the entire disclosure of which is incorporated herein by reference.

TECHNICAL FIELD

This invention relates to computer-based methods and systems for retrieving and organizing data and, more particularly, to computerized methods and systems for categorization of data based on the extraction and recognition of information from the data.

BACKGROUND INFORMATION

The data available to individuals and institutions that monitor the global financial markets is wide-ranging. Investment professionals responsible for monitoring a particular company or industry sector may receive thousands of individual information items each day. Some of these information items may be presented in well-formatted and categorized formats from reliable and well-known sources such as financial statements filed with a stock exchange or the Securities and Exchange Commission, whereas other information items may be in the form of informal correspondence such as email or instant message, phone conversations, or face to face meetings. Furthermore, the application of numerous internet communications technologies to the research and information publishing process over the last decade has increased the volume of information available for analysis and the speed at which it is delivered. Often, opportunities to take advantage investment opportunities based on such information may exist for only a short time. Furthermore, the opportunity to act on information may not be concurrent with the arrival of the information itself. It is critical that investment professionals be able to monitor the numerous sources of information, discern pertinent information from irrelevant information, analyze it as quickly as possible and base decisions on the information as it arrives. Investment professionals must therefore be able analyze, in short periods of opportunity, historic information that is often difficult and time-consuming to recall or retrieve manually.

One challenge facing investment professionals is the accurate identification and classification of the information they receive. Although information categorization is a relatively mature field in systems research and many methods exist for the analysis and categorization of text, they do not provide the accuracy and speed that is crucial in fields such as investment management.

Typically, information categorization depends on the features (e.g., recognizable contents) of source text used by categorization algorithms and the definition of the categories into which the text is to be grouped. Feature selection is a key aspect in establishing effective interpretation of the source material, and a well-chosen feature set can be used to subdivide or cluster a sample set of information, such as the way Internet news websites group the day's headlines by topics such as business, sports, law, national news, international news, etc. However, clustering with the best feature set does not provide adequate categorization. True categorization requires putting source material into meaningful destinations based on more than a general designation.

Category oriented thinking and collaborating is common across many professions—finance, medicine, business consulting, pharmaceuticals and so on. For many of these professions systems of categorization (also referred to as "ontologies") have evolved to a high level of effectiveness. Experts in such fields communicate, analyze, and make decisions implicitly using their established systems of categorization. For example, investment professionals understand "IBM" as a meaningful entity—as a corporation, as a topic of discussion, as an equity traded on the New York Stock Exchange, as the subject of a financial model, and/or as a competitor to Microsoft. Because of the well-established meaning, "IBM" instantly conveys the context. For these reasons, "IBM" is an extremely useful way to characterize the content of an email, a news story, a phone call, a financial statement. Conventional ontologies used by finance professionals organize research items by company, industry, and sector. Other categorization schemas use "trades" or "deals" as the principle organizing unit.

Information extraction is another technique used as part of the document classification process. Essentially, information extraction refers to the conversion of unstructured or loosely structured data into structured formats such that it can be queried and processed (see, for example, ACM Queue November 2005: http://www.acmqueue.com/modules.php?name=Content&pa=showpage&pid=350). Unlike conventional information search methodologies that build new representations of the underlying data (i.e., the search index), information extraction attempts to build a structure for the source data based on the contents of the data itself.

Neither of these approaches, however, address the fundamental challenges that face investment professionals. Specifically, what is needed is a technique and supporting system that effectively and accurately categorizes information based on user-defined categories while considering the type and source of information, user-specific rulesets, and can effectively determine the relevancy of a document to a particular individual based thereon.

SUMMARY OF THE INVENTION

In general, the invention relates to computer based tools that identify and categorize data received from multiple sources. Tools such as those described, for example, in co-pending U.S. patent application Ser. No. 10/987,375, "Systems and Methods for Retrieving Data" (incorporated by reference herein in its entirety) allow investment professionals to easily and simultaneously request, capture, store, retrieve and distribute a variety of information available in various forms (e.g., emails, instant messages, documents, newswire releases, etc.). While these tools provide ready access to an investment professional's internal research, meeting notes, emails, investment models and the like, the value of the information is increased significantly if it can be accurately categorized according to a categorization scheme that is relevant to the investment professional. During a typical day, an investment professional may navigate to dozens or even hundreds of web pages, receive hundreds of emails, receive countless documents (e.g., press releases, SEC filings, analyst reports, etc.) while gatherer information on companies, people and topics of interest that may affect various investments. Typically, an analyst concentrates her efforts on a particular entity of interest at one time—i.e., the current "focus" of her research, but often changes the focus of his research very quickly as events occur or priorities change. Therefore, the more quickly and more efficiently an investment professional can request, receive and review information from the multitude of sources, especially in rapidly changing environments, the more effectively she will be able to perform her duties. Being able to have the influx of information be automatically classified and stored according to a classification scheme that mirrors her view of the investment landscape ("reference data") significantly increases here efficiency and effectiveness.

By using reference data that is meaningful to the user, the information extraction and classification system builds a detailed meta-data structure against which information items may be applied. More specifically, the information extraction methods facilitate the construction of a feature set that may be used to categorize information as it received from various sources in diverse formats, many of which are often unstructured. Furthermore, using an field-specific ontology allows for the categorization into well-established and meaningful conceptual categories. At a high level, the system receives data in any format, extracts relevant pieces of the data, determines what the data is about, and passes the information on to various clients that store, use and/or further distribute the information.

Accordingly, a first aspect of the invention provides a method for classifying information that includes providing a list of entities (such as company names, ticker symbols, personal names, product names, industries, indices, abbreviations, or subjects) receiving an information item and searching the information item for possible references to the entities within the information item. Possible references of the entities are identified within the item, and an accuracy confidence level is calculated, describing the probability that the identified possible references actually contain the entity. Based on the accuracy confidence level and a set of categorization rules, the information item is associated with the entity, and a category confidence level is calculated describing the probability that the information item relates to the entity. Based on the category confidence level the information item can then be associated with the entity.

The information item may be an electronic message, an email, an instant message, a financial report, a voicemail, a web page, a research report, an electronic document, an RSS feed, a subscription, an electronic filing, a wire service message, or a press release. Scanning the information item may, in some embodiments, include searching the item for text that matches an entity, and in some versions phonetic variants thereof. The accuracy confidence level may be based on the location within the information item that the possible reference is found, the frequency that the possible reference is found and/or the source of the information item. Similarly, the categorization rules may consider, in some instances, on the source of the information item, the time of receipt (e.g., the time of day, day of the week, calendar date, and/or elapsed time since a defined event). In some embodiments, historical behaviors of individuals (e.g., websites visited, messages received, messages sent, messages read, etc.) may be influence the categorization rules.

In some embodiments, a cost function describing a user's tolerance for falsely associated information items may be used to determine a relevance of the information item to a particular individual. Examples of falsely associated information include items associated with an entity that are not about the entity and/or items that are not associated with an entity to which the information relates. The cost function may, in some cases, vary among individuals, thereby allowing different individuals to indicate their own tolerance levels.

Further, in some implementations a recall probability may be calculated that describes, for a set of information items, the probability that a given item is associated with an entity given that it actually is about the entity. Similarly, a precision probability may be calculated that describes, for a set of information items, the probability that a given item is about an entity given that it is actually associated with that entity. In some cases, the cost function and/or the categorization rules are adjusted such that the recall probability and/or the precision probability maintain a minimum value over a set of information items. In certain cases, the cost function may be generated based on historical behaviors of an individual such as websites visited, messages received, messages sent and/or messages read.

In some embodiments of the invention, the information item may be associated with a second entity based on, for example, a defined relationship between the first entity and the second entity. Examples of defined relationships between the first and second entity include a legal relationship, a parent-subsidiary relationship, a licensor-licensee relationship, a business relationship, a customer-supplier relationship or a competitive relationship.

A second aspect of the invention provide a system for classifying information that includes a database for storing entity identifiers, a receiver for receiving an information item and an entity extractor for searching the information item for possible references to the entities within the information item, identifying possible references to entities within the information item, and calculating an accuracy confidence level that the possible references contain the entity. The system also includes a categorization engine for associating the information item with the entity based on the accuracy confidence level and a set of categorization rules, calculating a category confidence level that the information item relates to the entity, and associating the information item with the entity based on the category confidence level.

In some embodiments, the system may also include a database for storing the categorization rules as well as a database for storing user-specific cost functions that describe the user's tolerance for falsely-associated information items. The system may also, in some implementations, include a relevancy engine for calculating the relevancy of a particular information item to an individual based on the category confidence level and the cost function associated with that user. In some cases, a categorization agent may be provided to allow users to manually associate information items with entities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
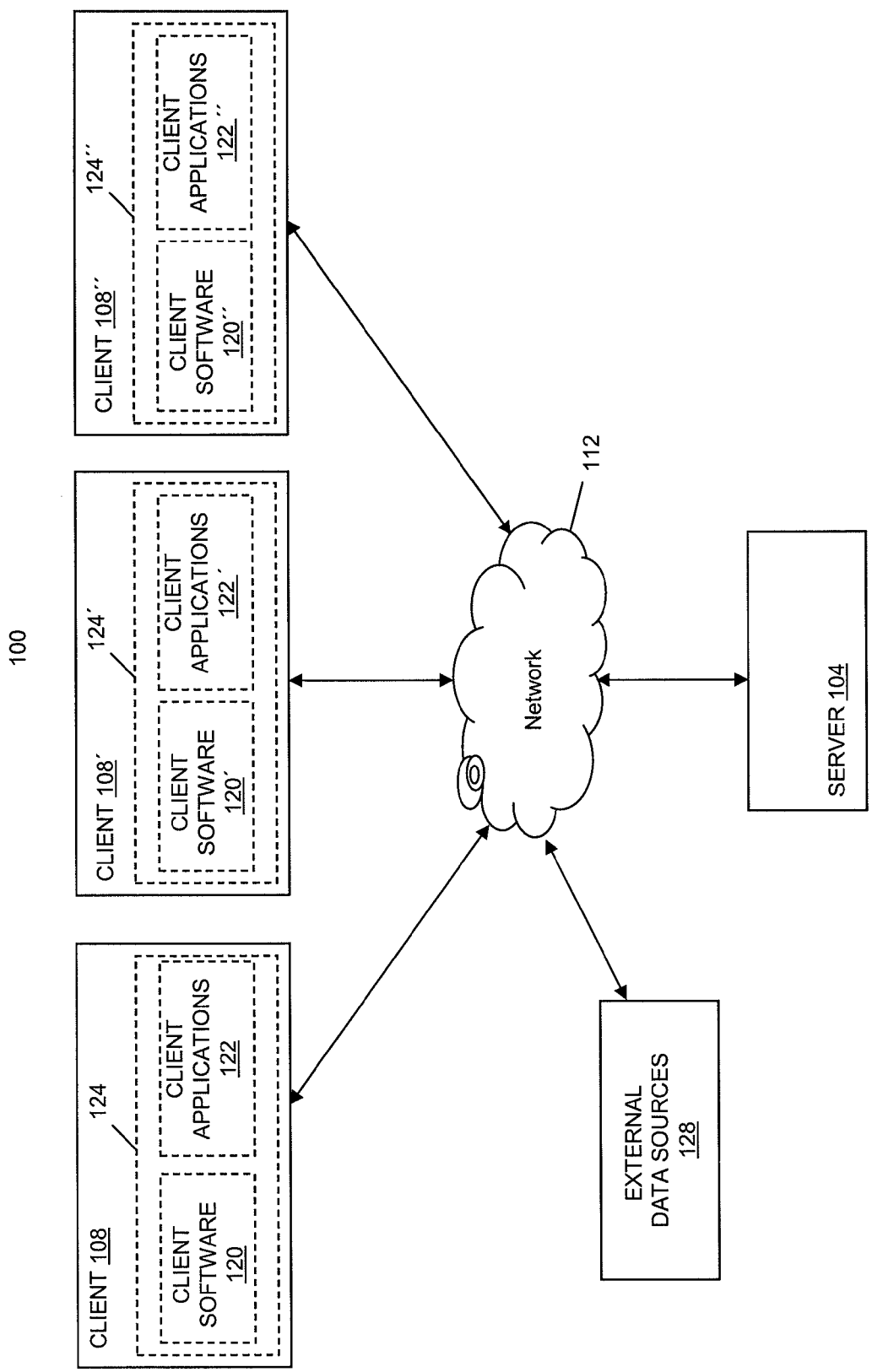
FIG. 1 is a block diagram of a system according to various embodiments of the invention.

Referring to FIG. 1, in one embodiment, an information categorization, storage and retrieval system 100 includes at least one server 104, and at least one client 108, 108', 108", generally 108. As shown, the information categorization, storage and retrieval system 100 includes three clients 108, 108', 108", but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 may also be implemented on such hardware as a smart or dumb terminal, network computer, personal data assistant, wireless device, information appliance, workstation, minicomputer, mainframe computer, or other computing device that is operated as a general purpose computer or a special purpose hardware device solely used for serving as a client 108 in the information storage and retrieval system 100.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links, and so on. Preferably, the network 112 can carry TCP/IP protocol communications, and HTTP/HTTPS requests made by the web browser and the connection between the client software 120 and the server 104 can be communicated over such TCP/IP networks. The type of network is not limited, however, and any suitable network may be used. Typical examples of networks that can serve as the communications network 112 include a wireless or wired Ethernet-based intranet, a local or wide-area network (LAN or WAN), and/or the global communications network known as the Internet, which may accommodate many different communications media and protocols.

Generally, clients 108 are operated by users of the system to receive, review, store and retrieve data regarding investment opportunities. In various embodiments, the client computer 108 includes client applications 122, client software 120, or both. One example of a client application 122 is a web browser application that allows the client 108 to request a web page (e.g. from the server 104 or a server operated by another company or individual) with a web page request. An example of a web page is a data file that includes computer executable or interpretable information, graphics, sound, text, and/or video, that can be displayed, executed, played, processed, streamed, and/or stored and that can contain links, or pointers, to other web pages. Other examples include electronic mail applications, as well as custom-developed desktop applications. In one embodiment, a user of the client 108 manually requests a web page from the server 104. Alternatively, the client 108 automatically makes requests with the web browser. Examples of commercially available web browser software are INTERNET EXPLORER, offered by Microsoft Corporation of Redmond, Wash., NETSCAPE NAVIGATOR, offered by AOL/Time Warner of Mountain View, Calif. and FIREFOX by the Mozilla Corporation of Mountain View, Calif.

In some embodiments, the client 108 also includes client software 120. The client software 120 provides functionality to the client 108 that allows a user to request and receive data using the methods described herein. The client software 120 may be implemented in various forms. For example, it may be in the form of a Java applet that is downloaded to the client 108 and runs in conjunction with one or more client applications 122. The client software 120 may be a standalone application written in C/C++, C#, Java or other appropriate client programming language. The client software 120 may be in the form of an application plug-in written in Visual Basic, C/C++, or C# that operates within a client application 122. Further, the client software 120 may be in the form of a standalone application, implemented in a multi-platform language such as Java, in a Net Framework language such as C#, or in native processor executable code. In one embodiment, if executing on the client 108, the client software 120 opens a network connection to the server 104 over the communications network 112 and communicates via that connection to the server 104. The client software 120 and the web browser may be part of a single client-server interface 124; for example, the client software can be implemented as a "plug-in" to the web browser. The web browser is but one possible example of a client application, and others may include word processors, spreadsheets, operating system extensions, email clients, as well as others.

The information being received and reviewed by the users may be received from numerous sources. For example, much of the information an analyst or fund manager may review on a daily basis is "internal" information generated by other members of his team or departments within his firm. In many cases, however, the users receive information from one or more external data sources 128. These data sources may be individuals (e.g., other analysts, friends, business acquaintances, etc.), government agencies such as the SEC and the IRS, markets (e.g., the NYSE, NASDAQ, CBOT, NIKKEI, etc.) and/or data subscription services such as Reuters, Bloomberg and Thompson Financial. The information may be "requested"—i.e., as part of a subscription service or in response to a particular inquiry, as well as unsolicited, as blast emails, product or marketing announcements, news stories, etc. In each case, the ability to effectively classify the information using a categorization scheme based on the user's view of the investment landscape significantly increases the value of the information by making it actionable and easier to find.

In some embodiments, an administrator operates the server 104, which provides data to the clients 108 upon request. In some embodiments, the server 104 operates without intervention from an administrator, for example, by executing chron jobs at periodic intervals, or executing batch routines based on the detection of operational occurrences such as equipment failures, power surges, or other monitored events. The server 104 is preferably implemented on one or more server class computers that have sufficient memory, data storage, and processing power and that run a server class operating system (e.g. SUN Solaris, GNU/Linux, MICROSOFT WINDOWS 2000, and later versions, or other such operating system). Other types of system hardware and software than those described herein may also be used, depending on the capacity of the device, the number of users and the amount of data received. For example, the server 104 may be part of a server farm or server network, which is a logical group of one or more servers. As another example, there may be multiple servers 104 that may be associated or connected with each other, or multiple servers may operate independently, but with shared data. As is typical in large-scale systems, application software could be implemented in components, with different components running on different server computers, on the same server, or some combination.

Figure 2:
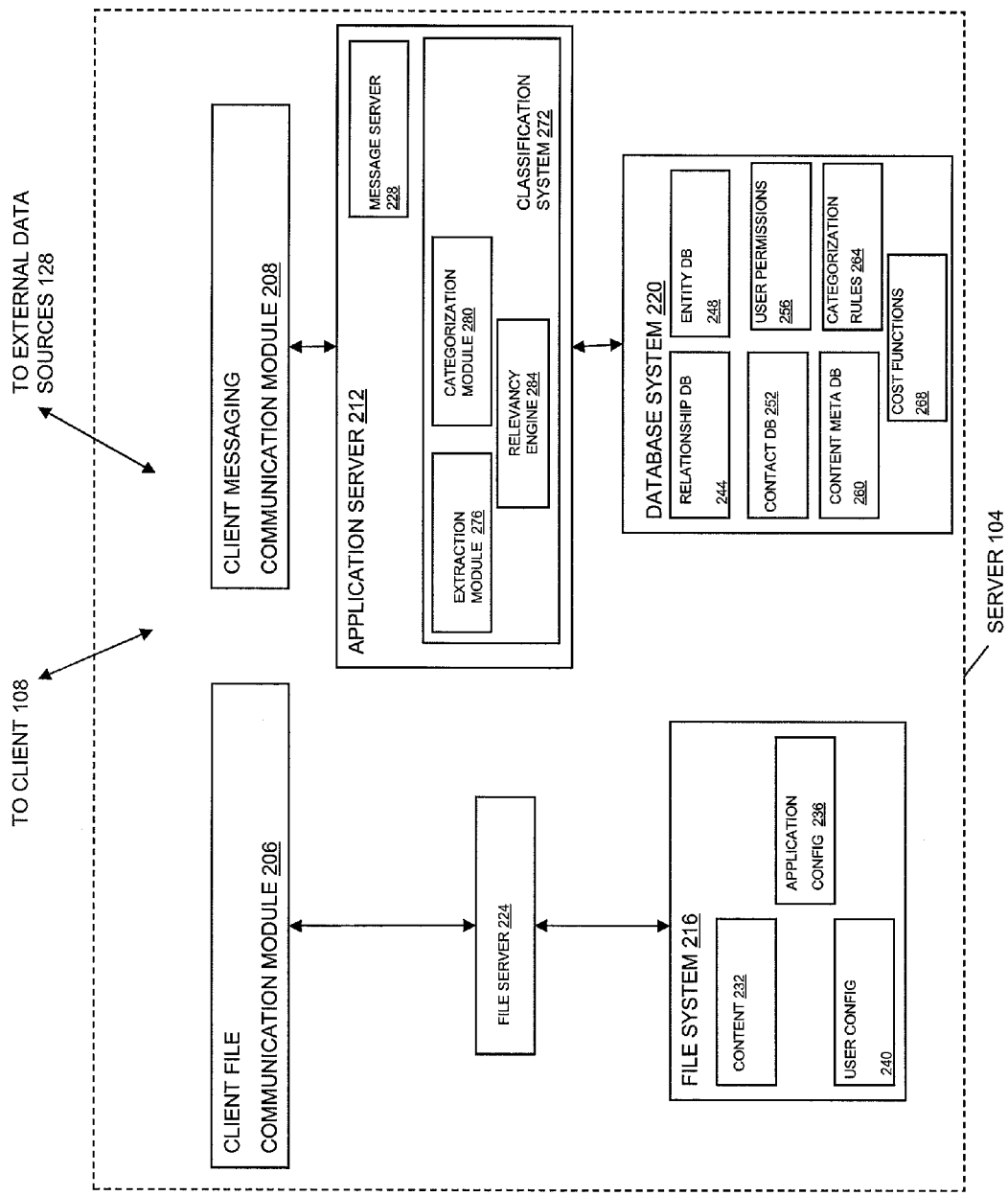
FIG. 2 is a block diagram of a server in the system of FIG. 1 according to various embodiments of the invention.

Referring to FIG. 2, in one embodiment, a server 104 includes a client file communication module 206 that is the interface for communication with clients 108 involving the transfer of files. In some instances, files may be transferred from the client 108 to the server 104, from the server 104 to the client 108, or both. The client communication module 206 can be implemented as software running on one or more servers, or may be implemented as a stand-alone server. In some embodiments, the client file communication module 206 can provide an interface both to client software 120 and to client applications 122, so that, for example, a user can access investment performance information through a web browser, a word processing application, or to review other data, and so on, while the client software 120 can be used for requesting and receiving additional information, or for defining parameters of the system. The interface to each of the client software 120 and the client applications 122 can be implemented separately or in combination. In other embodiments, the client file communication module 206 can also communicate using other protocols or mechanisms.

The server 104 may also include a client messaging communication module 208 as an interface for communication with clients 108 involving HTTP/S requests and responses, Java messages, SMTP messages, POP3 messages, instant messages, RSS feeds, as well as other electronic messages. In some instances, messages may be transferred from the client 108 to the server 104, from the server 104 to the client 108, or both. The client messaging communication module 208 can be implemented as software running on one or more servers, or may be implemented as a stand-alone server. In some embodiments, the client messaging communication module 208 can provide an interface both to client software 120 and to client applications 122, so that, for example, a user can send and receive e-mail, instant messages, and so on, while the client software 120 can be used for requesting and receiving additional information, or for defining parameters of the system. The interface to each of the client software 120 and the client applications 122 can be implemented separately or in combination. In other embodiments, the client messaging communication module 208 can also communicate using other protocols or mechanisms.

The client messaging communication module 208 communicates with the application server 212, which provides the main programming logic for the operation of the system. In one embodiment, the application server 212 is implemented as one or more application programs running on a server class computer, which may be the same or different computer as the client file communication module 206 or the client messaging communication module 208. The application server 212 receives requests for data stored in a database (such as an email, the historical performance of an investment vehicle, etc.) from users via the client messaging communication module 208, provides updated data to the client 108, and enforces system, application, and user level rules.

The server 104 also includes a database system 220, which stores data related to the investment opportunities, user permissions, industry data, and the like in one or more databases. For instance, the database server 220 may store information relating to entities defined by the users of the system, relationships among the entities, stored content, user information, server availability, and web traffic information. The database server 220 may also contain separate databases for relationships 244, entities 248, contacts of the users 252, user permissions and security information 256, content metadata 260, categorization rules 264 and cost functions 268 (each described in greater detail below).

In some embodiments, the database system 220 includes databases for storing, updating and provisioning join groups 262 and URL listings 265 to facilitate the automated updating of multiple applications or application modules based on user-provided inputs to other applications. The database server 220 provides data to the application server 212. An example of the database server 220 is the MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif.

The server 104 also includes a file server 224 and a file storage system 216, which stores static data files 232 related to, for example, investment opportunities such as web pages, word processing documents, spreadsheets, PDF files, and other information received from both internal and external sources. The file server 224 receives requests for static data files from the client 108 via the client file communications module 206, transmits the request to the file storage system 216, and manages the status of the file once it is sent to the client 108. The file storage system 216 also stores application configuration information 236, such as server names, communication protocols, directory structures, and other aspects of the application that may be customized at the application, server, or system level. The file server 216 can also store user configuration information 240 (e.g., screen preferences, desktop layout preferences, join groups, menu options, security and administrative information, etc.). Such functional aspects of the application may be applied across an organization or customized and stored for individual users.

In one embodiment, the file storage system 216 stores only data files, while file metadata such as the file location, the author, the creation date, file revision history and other metadata are stored in the content metadata DB 260.

In certain embodiments, the application server 212 includes various modules for executing stored software procedures directed at implementing the functionality described herein. For example, a message server 228 facilitates the communication among the various system components by monitoring message queues, forwarding the messages to the appropriate components or modules, and managing responses to messages. The application server 212 also includes a classification system 272. At a high level, the classification system receives information items in any format, extracts relevant pieces of data from the information items, determines what the information is about, and passes this information on to the various other modules, databases, application components and/or clients that store and/or use the information items. In one embodiment, the classification system 272 includes pluggable, componentized modules, meaning that different modules can be plugged into the architecture in certain pre-defined locations, operated independently of each other and tuned to meet specific processing and/or accuracy needs. The primary components that make up the classification system include an information extraction module 276, an information categorization module 280 and an interface that mediates communication between them (not shown). In some embodiments, the classification system also includes a relevancy engine 284. Each module may be implemented as a separate component and run independently, so, for example, it is possible to run extraction without categorization and vice versa.

In certain implementations, the information extraction 276 module scans information items in any format and attempts to identify potential references to recognizable entities defined in the system that are of interest to the users. More specifically, the goal of the extraction module is to extract any information that is relevant to an entity (e.g., a company, an industry, an idea, a person, etc.) that exists in a defined reference data set, such that the information item (and in some cases elements within the item) can be accurately linked to entities of interest. The categorization module 280 associates the information items with the appropriate entity (or entities), and in some instances, pass the categorized information on to the relevancy engine 248 for a further determination of the relevancy of the information item for individual users. The functionality of each of these modules are described in greater detail below.

Figure 3:
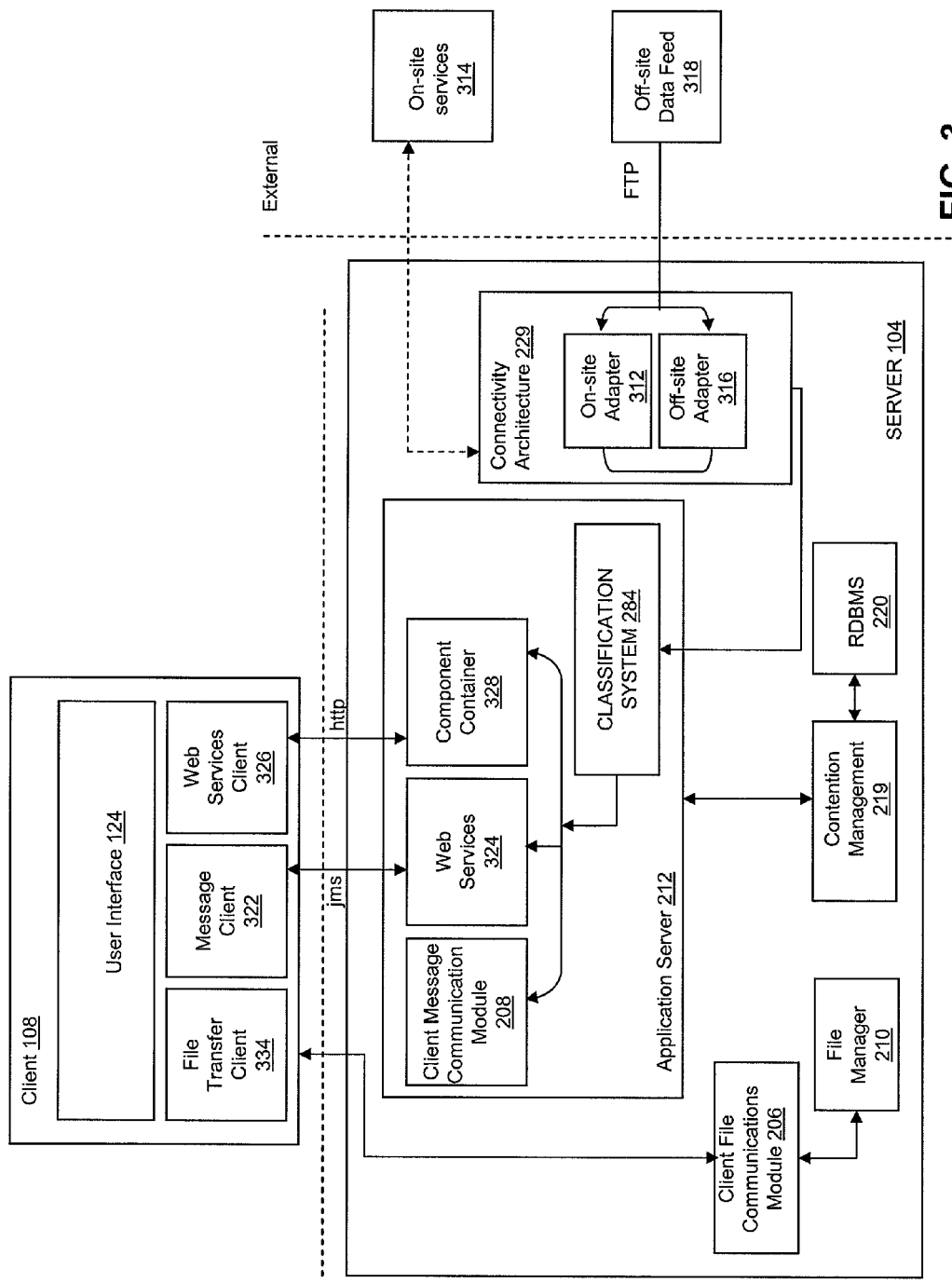
FIG. 3 is a block diagram of a server and client in the system of FIG. 1 according to various embodiments of the invention.

Referring to FIG. 3, in one embodiment, the client 108 includes a message client module 322, a web services client 326, and file transfer client module 334. The message client module 322 receives messages via the Java messaging service or other similar communications service from the application server 212 via the client messaging communications module 208. Upon receiving a message from the client messaging communications module 208, the message client 322 facilitates the display of the message on the user interface 124. The web services client module 326 facilitates receiving data from the application server 212 via a web services server module 324 such as the Apache Axis Web Services software via HTTP or some similar protocol. Both the web services module 324 and the client message communication module 208 publish data, for example, in XML format such that data may be automatically received by the web services client 326 and displayed on the user interface 124 without user interaction. The file transfer client 334 may request and receive files from the file server 224 using a protocol such as the File Transfer Protocol (FTP), WebDAV or variant thereof via the client file communications module 206. The server 104 may also include a contention resolution module 219 for managing user permissions and data privacy and contention issues when the application server 212 requests or updates data in the database system 220.

In some embodiments, the server 104 includes connectivity architecture 329 comprising adapters for receiving, filtering, and formatting data feeds from sources external to the system. In one embodiment, an on-site adapter 312 receives data from on-site services 314, via the Java messaging service or other similar messaging service. A second, off-site adapter 316 can receive data from off-site data providers 318 such as FirstCall available from Thompson Financial and Street Events available from CCBN via a standard File Transfer Protocol (FTP) or other file transfer protocols or RSS feeds. In some embodiments, different adapters may be employed for different data sources.

The server 104 may also include, in some embodiments, a component container module 328 such as the Enterprise Java Beans container for storing application components which may be used by the application server 212.

Figure 4:
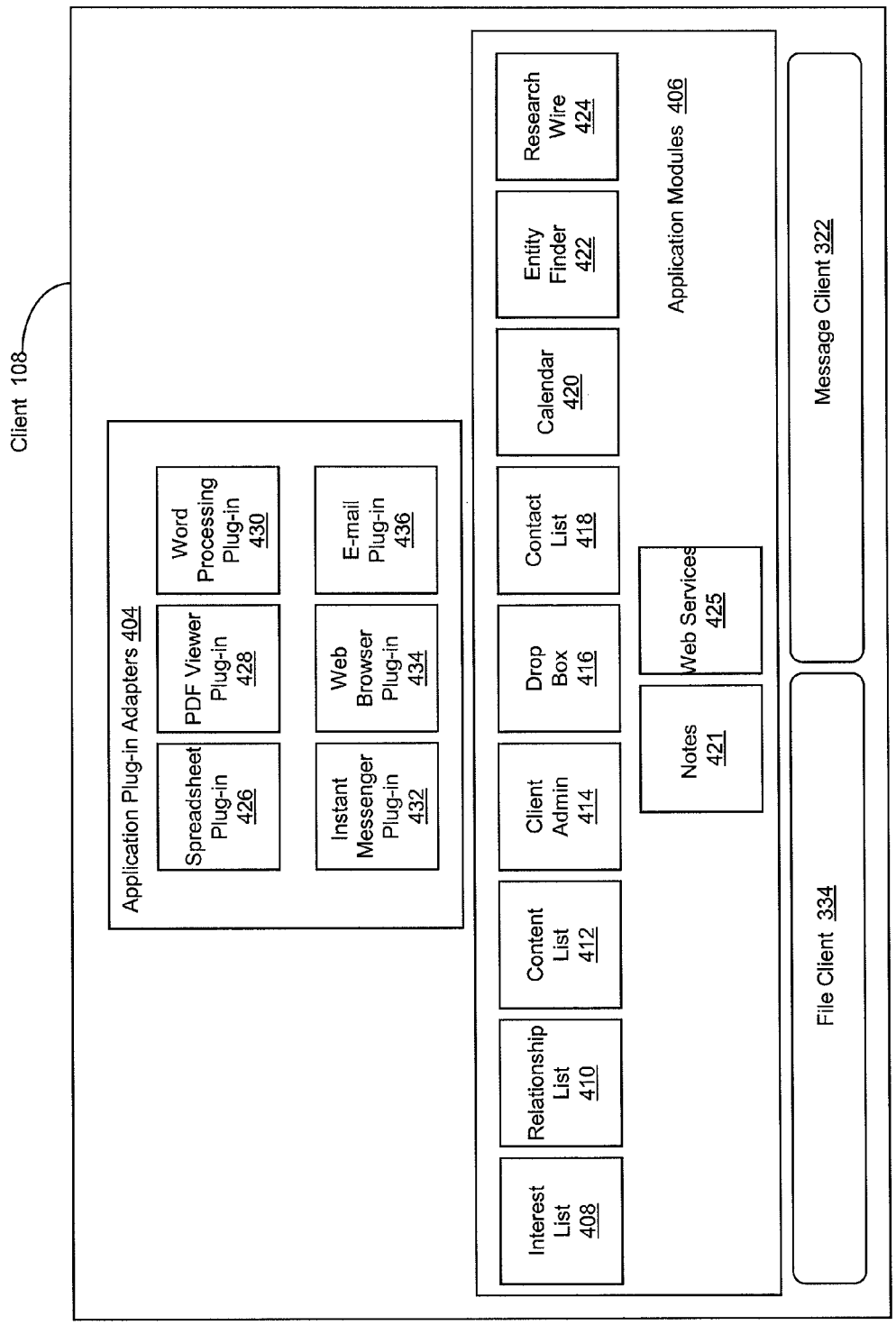
FIG. 4 is a block diagram of a client in the system of FIG. 1 according to various embodiments of the invention.

Referring to FIG. 4, in one embodiment, the client 108 includes application plug-in adapters 404 and application function modules 406. The application plug-in adapters 404 ("plug-ins") facilitate the capture of data, files, content, and other information presented to the user in other commercially available or custom developed software applications that reside on the client 108 or the server 104. Exemplary applications include, but are not limited to, spreadsheet application plug-ins 426 for software such as Microsoft Excel; postscript data format (PDF) viewer application plug-ins 428 for software such as Adobe Acrobat; word processing application plug-ins 430 for software such as Microsoft Word; instant messenger application plug-ins 432 for software such as AOL's Instant Messenger; web browser application plug-ins 434 for software such as Netscape Navigator or Microsoft Explorer; and email application plug-ins 436 for software such as Microsoft Outlook, Lotus Notes, Qualcomm Eudora; as well as adapters for other client-resident applications from which information may be captured. In some embodiments, the plug-in adapters 404 may facilitate capturing information from applications that reside on the server, 104.

In some embodiments, the plug-ins 404 are initiated by selections from a menu or buttons on a toolbar within a client application 122, and in some cases may not require the client software 120 to be operational or to be invoked. For example, a user may receive an electronic mail message with important information regarding a particular entity. In such cases where the toolbar for the user's electronic mail client application has been updated with the email plug-in 436, the user only needs to highlight the desired message (or portions thereof) and click or select the plug-in button. The email plug-in 436 captures the information, and sends it to the file system 216 via the file server 224. Similarly, data being viewed on a World Wide Web content page, as part of a newswire, or from other publicly or privately published documents may be captured and stored in the system using plug-ins adapted for the particular client application 122 used to receive and view the information.

In some embodiments, the client 108 also includes a join group list module 450 that facilitates the creation, viewing, selection and updating of join groups. Join groups allow users to "group" multiple application modules 406, and designate the modules as part of a collection of related modules that are intended to act in concert with each other, as described in greater detail below.

The application function modules 406 facilitate the review, creation, and manipulation of various elements of the system such as information items, personal display and security settings, application defaults, etc. For example, some embodiments may include an interest list module 408 for maintaining one or more lists of topics that may be of particular interest to a user or group of users. Examples of topics that may be included in such a list include companies, financial markets such as the NASDAQ or NYSE, investment vehicles such as bonds or equities, geographic regions such as Japan or the European Union, industries such as computers or automobiles, political issues such as unions or healthcare reform, and the like.

Some embodiments can include an entity finder module 422 for finding or creating an entity to which information may be attributed. For example, a user may be interested in the computer hardware industry, and create entities for the companies that manufacture and sell computer hardware. In some embodiments, the list of entities is pre-populated with a list of companies based on membership in an industry group such as those companies that are listed on a particular stock exchange. In some embodiments, the list of entries can be created by the users of the system.

Some embodiments can include a relationship list module 410 for reviewing and defining relationships between entities. For example, if company A supplies raw materials such as steel or computer chips to company B that company B uses to make its products, a relationship may be defined indicating that company A supplies goods or services to company B. Similar relationships may be created for companies that are competitors, partners, subsidiaries, as well as other business and legal relationships.

Some embodiments can include additional application modules such as a content list module 412 for reviewing information pertaining to one or more entities; a client administration module 414 for facilitating the customization of the user interface 124 for individual users; a drop box module 416 which allows users to easily associate a file or partial content from a file with a particular entity; a contact list module 418 for maintaining information about people from whom one or more users of the system receive information; a calendar module 420 for listing dated events pertaining to entities such as earnings announcements or product launches; a notes module 421 for allowing the creation, storage, and sharing of user-created notes; a research wire module 424 for reviewing information such as research reports published by financial analysts; and a client web services module 425 to facilitate the synchronous request/response of data on the server. In addition, an asynchronous interface composed of a messaging client and a messaging server, for example a Java Messaging Service client/server pair, facilitate the asynchronous update of data residing on the client 108 as it is updated on the server 104 and exposed using the web services module 324 residing on the server 104.

Figure 5:
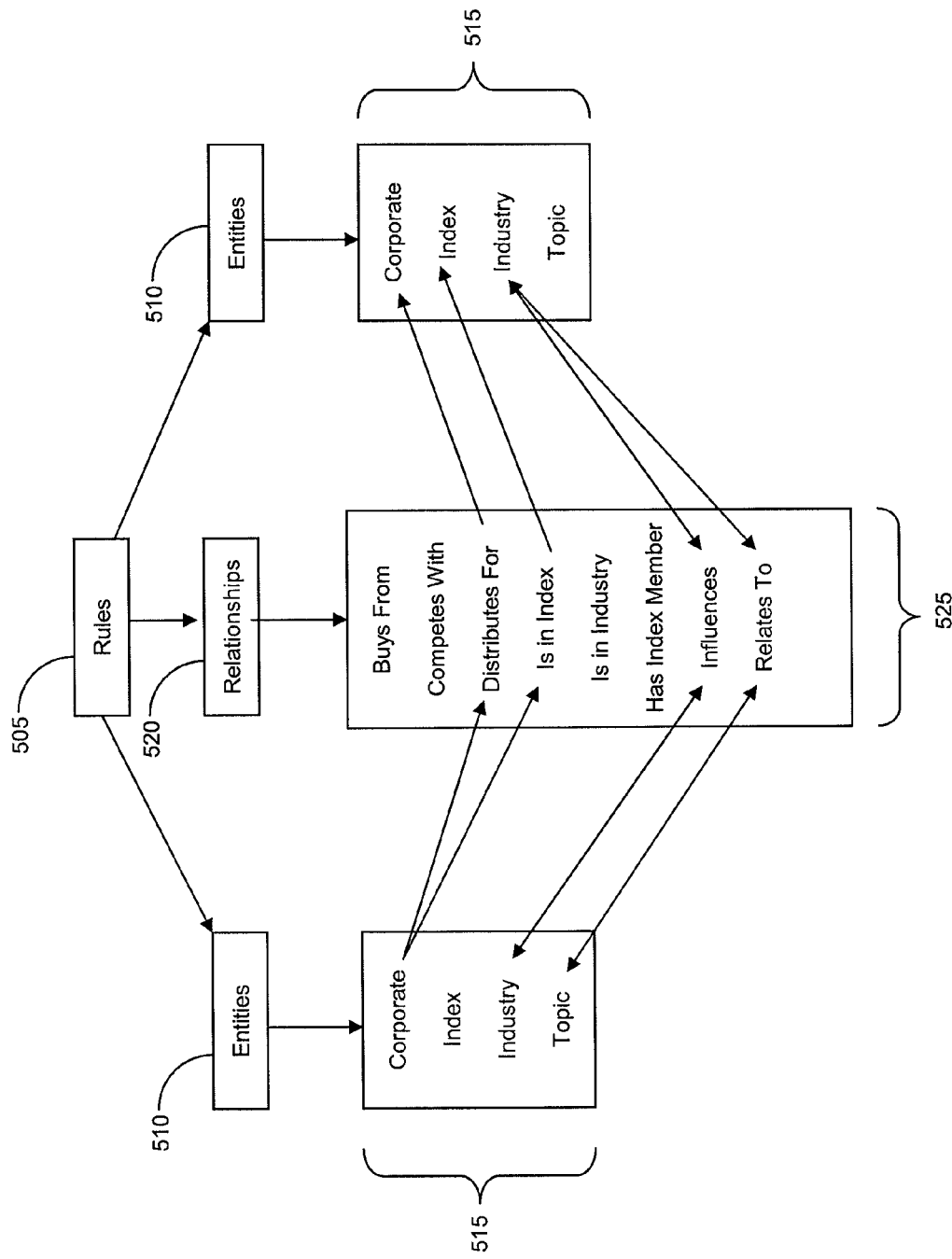
FIG. 5 is a block diagram illustrating relationships among entities within the system in accordance with one embodiment of the invention.

Referring to FIG. 5, in one embodiment, a set of rules 505 govern the creation of the entities 510, the type of entities 515 that can be created, the creation of the relationships 520, the types of relationships 525 that can be created, and which relationships may be used to link entities of a given type. In one embodiment, the rules 505 can describe the entity types 515 that can be created. For example, the rules 505 can specify the entity types 515 as "corporate" entities representing companies, "index" entities representing groups of publicly held companies used to calculate a market statistic, "industry" entities representing a specific area of commerce, and "topic" entities representing subjects that may impact other entities. In another embodiment, the rules 505 can specify the relationship types 525 that can be created. For example, the rules 505 can specify the relationship types 525 as the relationship types listed in Table 1 below.

TABLE 1

Relationship Types
Relationship Type

Buys from
Competes with
Distributes for
Distributes through
Has subsidiaries
Is a subsidiary of
Is in index
Is in industry
Is supplied by
Partners with
Sells to
Has index member
Has industry member
Influences
Relates to In one embodiment, the rules 505 govern the relationships that one entity type may have with other entity types. For example, a corporate entity may have different relationships with other corporate entities than it would have with an index entity or a topic entity. Table 2 below contains one possible listing of relationship types and the rules associated with how they can be used to relate different entity types. It should be noted, however, that these exemplary relationships represent one particular set of relationships that may be implemented in a specific embodiment of the invention. Additional relationships used to describe the associations of entities with each other may be obvious to those skilled in the art of analyzing the performance of a company, an industry, or other similar entity.

TABLE 2

Relationship Rules

| Entity Type | Relationship Type | Allowable Related Entities |
| --- | --- | --- |
| Corporate | Buys from | Corporate |
| Corporate | Competes with | Corporate |
| Corporate | Distributes for | Corporate |
| Corporate | Distributes through | Corporate |
| Corporate | Has subsidiaries | Corporate |
| Corporate | Is a subsidiary of | Corporate |
| Corporate | Is in index | Index |
| Corporate | Is in industry | Industry |
| Corporate | Is supplied by | Corporate |
| Corporate | Partners with | Corporate |
| Corporate | Relates to | Topic |
| Corporate | Sells to | Corporate |
| Index | Has index member | Corporate |
| Index | Relates to | Topic |
| Industry | Distributes through | Industry |
| Industry | Has industry member | Corporate |
| Industry | Is supplied by | Industry |
| Industry | Relates to | Topic |
| Topic | Influences | Corporate |
| Topic | Relates to | Topic |

For example, if a user created an entity to represent a corporation which is listed on a particular stock exchange and that sells its products to another corporation, the rules 505 may permit the user to create an "is in index" relationship to an entity of type "index" and a "distributes for" relationship to an entity of type "corporate." In addition, the user may create an entity for an industry such as "healthcare" and a relationship to another industry such as "insurance." However, to maintain the integrity of the system, the rules 505 may prohibit certain relationships based on the entity and relationship types—e.g. the rules 505 may prohibit an "is in index" relationship between an industry entity (healthcare) and an index entity (NYSE) because industries are not listed on stock exchanges. Unlike systems with static lists of entities, a system that allows users to create, modify, and delete entities and the relationships between them, and to have these changes distributed across multiple users in real time provides a greater degree of flexibility to analysts. Such a system can focus on those industries or aspects of investment opportunities that are important to a given organization, maintain knowledge when people leave, and evolve as industries, companies, and investment opportunities grow and change.

In some embodiments, the relationships that connect the entities propagate across multiple entities—that is the same relationship linking a first entity to a second entity also can be the same type of relationship that links the second entity to a third, and so on. By providing such a feature, both direct relationships (entities connected by one or more relationships) as well as indirect relationships (entities separated by one or more intermediate entities, but otherwise reachable through multiple "hops," thus creating a chain of relationships) can be modeled. Two possible categories of propagating relationships include hierarchical and influential. In some cases, the relationships are reciprocal, i.e. a certain relationship type from entity A to entity B by definition implies a related or "reciprocal" relationship from B to A. For example, a series of propagating hierarchical relationships may be used to describe a large industry, a sub-industry, and a further specialized market within the sub-industry using the "has industry member" relationship and its reciprocal relationship "is in industry" among the hierarchical industry entities.

As an illustration, the automobile industry may have a "has industry member" relationship to a "truck industry" entity, which in turn may have the same "has industry member" relationship with a "light truck industry" entity. Moving back from "light truck industry" the relationships would indicate that the subordinate entity is related to the parent industry by an "is in industry" relationship. In this example, the "light truck industry" has an "is in industry" relationship with the "truck industry." Similar hierarchies can be represented for indices, for example, where a company's stock is a component of a market index. For example, an analyst that follows a market index such as the NASDAQ index may be interested in information items associated with companies such as Microsoft, Cisco, and others. By creating an "is in index" relationship from a Microsoft entity to a NASDAQ entity, and a reciprocal "has member" relationship from NASDAQ to Microsoft, results of requests for information associated with NASDAQ can also include information associated with Microsoft. Likewise, a particular equity or other investment vehicle can be directly or indirectly related to a mutual fund, hedge fund, or other actively or passively managed investment portfolio. By creating hierarchical relationships that span multiple entities, information items that provide valuable information to an analyst but that are associated with entities that are three or four relationships removed from the focus entity can still be retrieved.

Similarly, an influential relationship type describes relationships among entities that can influence each other, and is also reciprocal. Where a first entity influences a second entity, and an "influences" relationship connects the two from the first entity to the second, a reciprocal "is influenced by" relationship connects the same two entities in the opposite direction—e.g., from the second entity to the first. For example, a series of influential relationships can be used to connect entities representing political issues, world leaders, legal issues, and geographic regions: in a particular example, an entity representing "Bush Administration" has an influential relationship with an entity representing "Energy Policy" which in turn has an influential relationship with a third entity representing "Middle East Policy." Like the hierarchical relationships, the reciprocal nature of the influential relationships provides bi-directional relationships among the entities. Using the above example, where the entity "Bush Administration" is related to the entity "Energy Policy" through an "influences" relationship, the reciprocal "is influenced by" relationship can describe the relationship from the "Energy Policy" entity to the "Bush Administration" entity. Furthermore, because some entities have stronger influences on other entities, the relationships may be further annotated with an "influence factor." For example, an analyst may believe that the Bush Administration is highly influential on a Middle East Policy entity, but in contrast, only slightly influential on a "Tort Reform" entity. The ability to traverse across multiple relationships and include many entities in a set of entities that are potentially influential on a particular entity of interest can result in the retrieval of a larger collection of information items, including those that may not have been associated with the entity of interest, but valuable nonetheless. This large collection provides an analyst an exceptionally broad view of a market, an industry, and world events, which may in turn lead to better decisions regarding investments.

A user's interaction with the system generally centers around a particular entity (or sets of entities) described herein as the current "focus" of the user. As the user's interest changes (e.g., because she received new information, or was instructed to research a new opportunity), she may change her focus in the system by updating one or more parameters associated with a module of the system or an application embedded within the system (e.g., a URL in a web browser) or by selecting an item from a list (e.g., a folder on a file server using a folder-based operating system or within applications that support foldering such as commonly-available email clients). However, because news, pricing, rumors, and correspondence are typically received simultaneously for any number of entities (including, in many cases those not currently being researched), the focus of her research may change often and rapidly, and therefore the amount of time available to request, receive and review relevant information about these entities is limited. Therefore, it is crucial that the information presented to her be accurately categorized based on her understanding and view of the markets, and also relevant in subject and/or timeliness.

Two examples of ways to objectively measure the accuracy of information classification are recall and precision. Recall measures the probability that a given information item was associated with (also referred to as "classified with" or "C") a particular topic given that the information item is actually about that topic ("A"), and can be abbreviated as $P(C|A)$. If, for example, an information item such as a press release mentions Microsoft, but somehow a categorization technique failed to recognize the reference and did not associate the release with the entity "MSFT," the recall percentage for the corpus of information items would be negatively affected. A high number of mis-categorizations can negatively impact a trader's effectiveness, as their queries for information items associated with their focus of research will not return all the relevant information items. Similarly, precision measures the probability that an information item is about a particular entity, given that it is associated with that entity, or $P(A|C)$. Associating an information item with an entity when it is not related to or about that entity decreases the precision metric, and therefore queries for information items about their focus will return in items that are not relevant to their research. By implementing the techniques and systems described herein, the recall and precision measures can be optimized both on a system-wide scale based on data extraction and categorization rules, as well as at the individual level based on a user's personal preferences and past behaviors.

Figure 6:
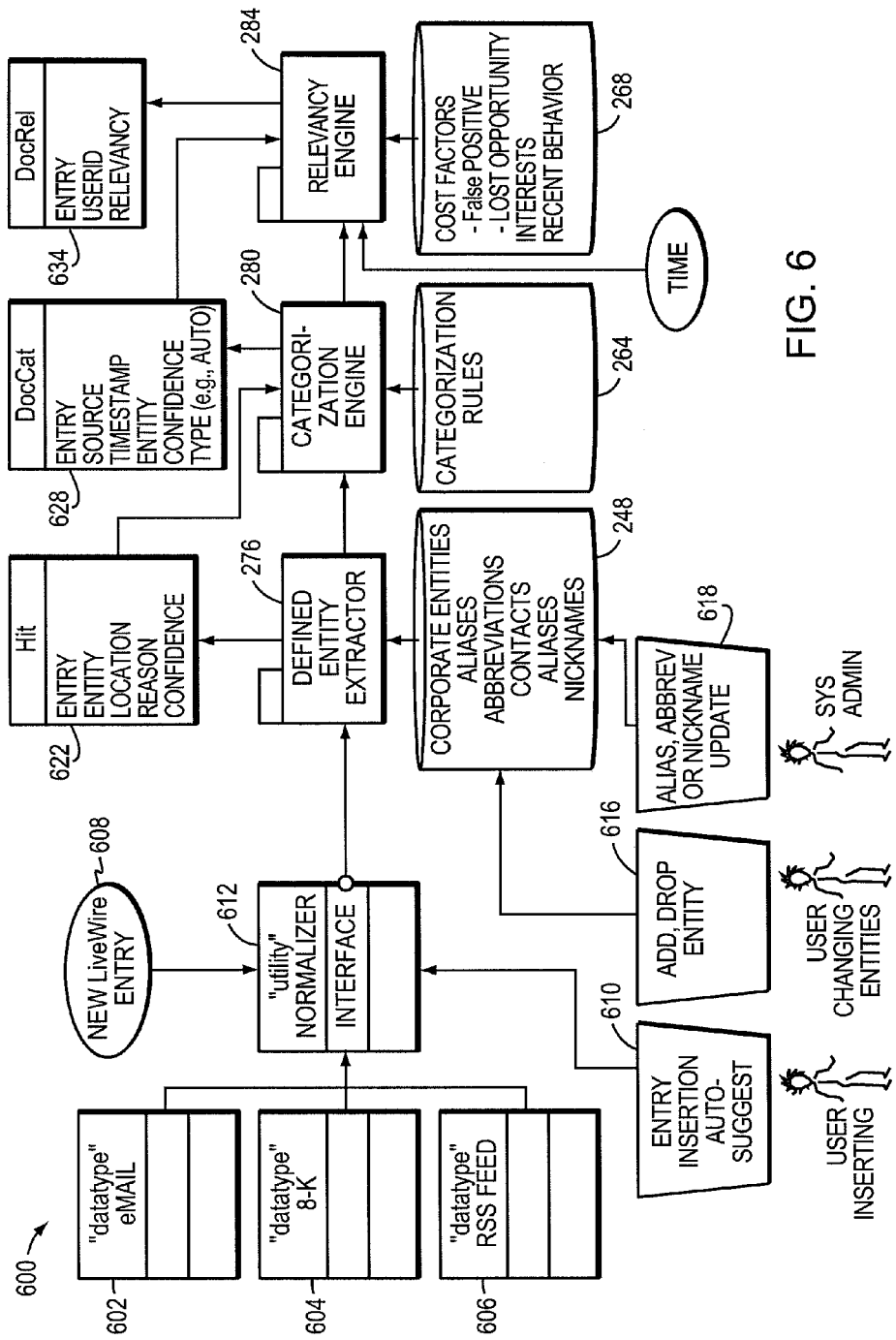
FIG. 6 is a flow chart illustrating the information classification process in accordance with one embodiment of the invention.

FIG. 6 illustrates a process 600 for classifying information items received by the system. Information items may be received from numerous sources and in varying data formats. For example, electronic messages 602 (such as emails and text messages) may received from known, trusted sources (e.g., co-workers, subscription-based electronic news services, etc.) as well as unknown sources such as a sell-side analyst looking to initiate interest in his research, press releases, and other information sent over publicly available wire services. Similarly, information may be received from electronic databases and/or filing services such as the SEC and IRS that represent periodic company filings such as an 8-K 604, a 10-Q and/or a 10-K filing. In some embodiments, additional feeds such as RSS feeds 606 and LiveWire feeds 608 are also received by the system and provide additional information items to be categorized. Together, these various sources of information items represent a corpus of information items that, when classified according to a meaningful categorization scheme (such as the entity/relationship structure described above) can provide meaningful insights into the investment landscape.

In some embodiments, a user may review an information item as (or sometime after) it arrives and manually assign it to one or more entities. For example, a user viewing an incoming email may utilize an application plug-in or other applet 610 within his email client application that provides a listing of entities with which the email can be assigned. In some embodiments, the plug-in may scan the email (e.g., the subject, the body, the domain from which it came as well as other header information) to assist the user in identifying the appropriate entity. In some instances, the applet may pre-populate a text field with an automatically suggested entity name, which the user may then accept or change.

Due to the fact that the system may receive information items from a variety of sources in varying formats, some implementations include an information item normalizer 612, that identifies and/or removes common ambiguities within information items. For example, the normalizer 612 may determine when a period (".") represents the end of sentence, a numerical decimal, or as part of an abbreviation. In other cases, the normalizer 612 may remove non-substantive characters or item components such as markup tags, image files, etc.

The normalized information items are then provided to the entity extractor module 276 that finds references to defined entities as stored in the entity database 248. In some embodiments, the entity database includes an expandable list of companies, topics, countries, people, markets and other subjects of interest to users of the system. The entity database 248 may also, in some cases, include variations of the entities such as common misspellings, abbreviations, aliases and nicknames to increase the probability that an information item about a particular topic will be properly classified. In some instances, pairings, triples, or other combinations of entities are defined to distinguish common terms (e.g., Apple) from defined entities of interest (e.g., Apple||Computer||Steve Jobs). In some embodiments, the entity database is pre-populated with commonly used names and acronyms, such as stock ticker symbols and the company names they represent, as one example. Other common abbreviations such as Inc., LLC, Ltd. and Corp. may also be included as abbreviations that typically follow an entity name such that a possible reference to the entity followed by one of these abbreviations indicates a strong likelihood that the information item is in fact referring to the company.

In some implementations, user-specific data such as Outlook contact lists may be imported into the entity database 248 such that information items that mention and/or are addressed to or from an individual know to users of the system may be automatically associated with the contact. Other user-specific data sources such as portfolio holdings, interest lists, etc. may also be used to populate the entity database 248. In some cases, the entity database 248 may also be populated with publicly available data such as the names of officers of publicly traded companies. In some embodiments, the entity database 248 may be populated with contacts, entities, and other topics from multiple users (e.g., a department or company-wide list) whereas in other implementations only certain users (or a centrally-approved list) are used to populate the entity database 248.

In many embodiments, the data in the entity database 248 will change over time due to new entities of interest, corporate events (e.g., mergers, bankruptcies, employment changes, name changes, etc.) and other events. In such cases, users may utilize an entity modification function 616 to update the entity database 248. Entities may be added, deleted or changed as necessary. In some embodiments the changes are immediate, whereas in other cases the changes are propagated throughout the system based on a periodic update. In some cases, certain users may be assigned specific responsibilities regarding maintaining the entity database 248 or portions thereof. For example, a certain analyst may be responsible for providing research on the aerospace and defense industry, and therefore be assigned with the task of maintaining an accurate list of the companies that operate in that market. In addition, global changes (e.g., the addition of a new entity type) may be implemented by a system administrator using an administrative update function 618.

The entity extractor 276 uses the data from the entity database 248 and the unclassified information items to attempt to identify references in the information items about entities in the entity database 248, resulting in a list of "hits" 622 that represent possible references to entities. In some embodiments, the list of hits includes fields for uniquely identifying the entry, a field for identifying the entity and a location field for indicating where in the information item the reference was found (e.g., title, paragraph number, word number, etc.). The list of hits may also include a reason field that indicates the reason the hit was identified, such as automatically generated by the entity extractor 248, manually entered by a user, received via a ticker feed, etc. In some embodiments, the hit list 622 also includes a confidence field that expresses the likelihood that the identified reference is actually referring to the entity. For example, the entity database may contain the entity "IBM." While a high confidence level indicates that a text string identified in the information item as being IBM is likely to be "IBM" it does not necessarily imply that the information item should be associated with the IBM entity.

More specifically, the purpose of the entity extraction module 276 is to identify each instance of a reference to a particular entity within an information item. For example, a user may wish to locate and identify all references to publicly traded companies within a news story received via an RSS feed. In one approach, the entity database 248 is used as the "lexicon" that provides the universe of entities of interest. The lexicon may be loaded into memory (e.g., cached) to allow for fast execution. As described above, the lexicon may include aliases and/or abbreviations, so that various references to an entity can be suitably mapped into the same equivalence class. In one implementation, loading the lexicon into memory involves creating a hash table with keys for every token used in the formal entity names. As used herein, a token is an alpha-numeric element of an entity name, which may, in some cases, also include special characters. For example, if an entity is 24/7 REAL MEDIA INC., one token may be "24/7" another token may be "REAL" and a third token "MEDIA."

In one embodiment, the values in the hash table are represented as a tuple, having a Boolean flag, FT that indicates if the token appears as the first token in an entity name, the actual token itself and an offset into an entity name table ("ENT"), containing records that have a one-to-one correspondence to defined entities of a particular entity type. The records in the ENT form a collection of linked lists, where each linked list contains all the names beginning with a particular token and also contain the actual tokens that make up the full name, and a progress field which can be used to track matching of full entity names. When a new document is scanned, and a token is found in the hash table with the Boolean flag, FT, is TRUE, then a chain of potential name matches is activated in the ENT, the progress field is set to 1, and scanning continues. As subsequent tokens are scanned, the active chains of possible matches are updated and when sufficient thresholds are reached, hits are signaled and the appropriate information is entered into the hit list 622.

In some implementations, there may be certain tokens that are unique to an entity and others that are not. For example, a corporate entity's ticker (e.g., MSFT) is guaranteed to be unique, whereas the first name of a contact (e.g., "John") is not. In some embodiments, the extraction module creates a uniqueness map of all tokens that are associated with an entity, such as the entity's name, it's email address, telephone number, etc, and assigns a uniqueness score to each term. In some cases, a term can be a fully express token, e.g., "Apple Computer Corporation" or a subset of a token such as "Apple." This uniqueness score may be used as a component of the accuracy confidence score.

In some implementations, the extraction module scans the information items for the tokens and creates a natural language feature map (NLFM) that incorporates the uniqueness scores described above. In one particular embodiment, the NLFM is a map of the potential matches found in an information item during the extraction process along with a set of natural language features such as the location of the potential match in the information item, the part of speech of the token, capitalization information, uniqueness score, number of co-reference matches (i.e., other matches that are likely matches to the same token) for each potential match. In various embodiments of the invention different techniques can be used during the extraction process, such as existing third-party natural language processing libraries, like Sheffield University's GATE, and IBM's UIMA. The NLFM is provided to the categorization engine 280 which categorizes the information items according to the results of the extraction phase and the set of categorization rules 264, as described below.

Following the extraction of defined entities from an information item the categorization engine 280 estimates a categorization confidence level that describes the likelihood that a particular information item actually refers to a particular entity topic. For each record in the hit table 622 for a particular entity, the accuracy confidence level estimates the likelihood that the identified text actually refers to the entity. The categorization engine uses the accuracy confidence level, along with other factors such as the source of the information item, the date and/or time of publishing, the author, the document size, metadata, and other similar features as input parameters to categorization rules 264 to estimate a categorization confidence level for each unique extracted entity from each information item. For example, an exact match of an entity in the title/headline of an article, in the first N tokens or bytes (where N is customizable by entity, type of information item, user or some combination thereof), and/or in first compositional division (sentence/paragraph) may receive a maximum categorization confidence score for that entity (for example, 100). If there are no exact matches in the first compositional division, then an aggregate score is computed that incorporates document size and entity frequency. One example of a formula for calculating the categorization confidence for a particular entity in an information item is indicated below:

$$95*\min(1, \#\{matches\}*3000/Document\_Size\_In\_Bytes)$$

Many linear or nonlinear variants of the categorization confidence scoring are possible. In some embodiments, for example, the scoring algorithm produces scores within a fixed range (0 to 100, for example), and the confidence level increases monotonically with each additional match and decreases monotonically as the document size increases given a constant number of matches. In some implementations the relative frequency of an entity across the entire corpora of information items influences the categorization confidence score such that entity names that appear with greater frequency require more matches to achieve the same confidence level than those that are relatively rare. For example, HEWLETT-PACKARD CO would normally be used as the full name for the corporate entity. In certain document sets the alias HP may be used as a moniker for the same corporate entity. However, the relatively high frequency of references to "HP printers" in information items that are not about Hewlett-Packard results in an weighting that is proportional to the inverse document frequency for HP when estimating the confidence level that the document as a whole deals with the corporate entity.

Further, co-referential material may be incorporated for certain corporate entities. For example, documents dealing with APPLE INC might not exhibit the full name of the company, or its previous full name (APPLE COMPUTER INC), but would have supportive material like references to the iPOD or non-supportive material like references to "apple pie." When these co-references appear within the same compositional divisions (sentences or paragraphs) within the information item, the categorization confidence score may adjusted using, for example, Bayes Theorem as applied to training data from the appropriate domain.

In some embodiments, metadata associated with the information item may be considered and influence the categorization confidence level. One example of metadata is SOURCE, which can greatly enhance the levels of both recall and precision. For example, an article from a particular trade publication in the tobacco industry may have two borderline (e.g., low accuracy confidence level) cases of corporate references, one referring to a retail home construction entity and the other referring to a company in the tobacco industry. In the case of the former, the categorization would be rejected, and, in the case of the latter, accepted. This rule may be expressed as the following:

> If the confidence that document D is about company X is greater than EPSILON and X is in industry Y and the focus of SOURCE of D is Y, then boost the odds ratio that document is about X by DELTA percent.

Categorization may also be improved by considering information item timestamps because, for some items, publishing dates are very predictable. In the case of corporate entities, for example, 8-K filings often include projected release dates of a company's financial information. Knowing these dates improves the probability that an item received on that date that references the company should be associated with that company. Further, most spam is sent off hours, and therefore information items received during the midnight to 5:00 am time frame may receive a reduced categorization confidence level, even if there are numerous references to an entity in the document.

In some embodiments, the categorization rules may allow for information items to be associated with more than one entity, and further, associated with entities that are not recognized in the information item during the extraction phase based on the entity-relationship network described above with respect to FIG. 5. For example, a press release that contains numerous mentions of both Microsoft and Zune will likely be associated with a corporate entity "MSFT" as well as a subject entity "ONLINE MUSIC." However, based on the entity-relationship network, the system recognizes that the "ONLINE MUSIC" entity is heavily influenced by the corporate entity "APPL." As a result, even though the information item makes no mention of APPL, Apple Computer, iPod, or other entities that directly relate to Apple Computer, the press release may be associated with Apple. In some embodiments, the type of relationships and/or the number of degrees of separation from the recognized entity to other entities determines if such "secondary" associations are made. For example, a user may indicate that only relationship types of "supplier" that are up to three degrees of separation from the recognized entity result in secondary associations.

Once information items have been categorized and associated with one or more entities, the relevancy engine 284 can convert the categorization confidence scores of information items associated with certain entities into a likely relevance score and create a table of user-specific relevancy records 634. In some instances, this relevancy score may be particular to an individual or group of individuals such that it varies from user to user. At a high level, an item's relevancy score is the probability that a particular information item is relevant to a particular user, given the overall categorization of the document (e.g., which entity or entities it is associated with and the categorization confidence for each association), interests of the user, past behavior of the user, and/or the user's perceived cost factors for diminished recall and precision. In some embodiments, the interests of the user may be explicitly expressed by category (e.g., subject area, a particular entity or set of entities, etc.), inferred based on passive input such as the content of the user's email inbox and active input) and/or based on past behavior of the user such as search queries, email behavior, recent trades, etc.

In some embodiments, information sets other than the text of the information item (e.g., the item's source) may be used as an input into the relevancy score as well. Essentially, the probability of relevance for a document D is computed as the combined probability that D deals with a least one category of interest to the user. Input into the relevancy calculations, may involve rules similar to those used in the categorization step described above. One example of such a rule is shown below:

If Document D has been categorized as being about entity E with confidence level ALPHA, and EPSILON or more percent of the user's queries have involved a search on entity E, then update the estimated relevancy score (OLDREL) by:

$$W*ALPHA*EPSILON+(1-W)*OLDREL$$

where W represents a weighting factor indicative of the user's preference for overriding explicit category relevance assertions with implied behavioral evidence. For example, a high W value (e.g., 0.99 on a scale of 0 to 1) will cause the relevancy engine to consider recent query interests far stronger than past relevancy calculations. In some embodiments, W is set to 0.5 such that new behaviors and previous relevancy values are equally weighted.

In summary, using reference data that is meaningful to the user, the information extraction and classification system of the present invention builds a detailed meta-data structure against which information items may be applied. Information extraction methods facilitate the categorization information as it received from various sources in diverse formats, many of which are often unstructured. Furthermore, using a field-specific ontology allows for the categorization into well-established and meaningful conceptual categories. As a result, the accuracy and relevance of the associations between information items and entities of interest to users is increased, leading to more productive searching and research, especially for users that often make decisions based on significant amounts of information in a limited time.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A computer-implemented method for classifying information items, the computer comprising a processor and a memory, the method comprising:
   storing on the memory a list of entities in a database;
   receiving an information item via a receiver;
   using an entity extractor module operating on a computing device to (i) electronically search the information item for references to the entities within the information item; (ii) identify at least one possible reference to at least one of the entities within the information item; and (iii) calculate an accuracy confidence level that the possible reference to at least one of the entities contains the at least one of the entities; and
   using a categorization engine operating on the computing device to: (i) associate the information item with the at least one of the entities based at least in part on the accuracy confidence level and a set of categorization rules; (ii) calculate a category confidence level that the information item relates to the at least one of the entities; and (iii) associate the information with the at least one entity based at least in part on the category confidence level.

2. The computer-implemented method of claim 1 wherein the list of entities includes one or more company names, ticker symbols, personal names, product names, industries, indices, abbreviations, or subjects.

3. The computer-implemented method of claim 1 wherein the information item comprises at least one of an electronic message, an email, an instant message, a financial report, a voicemail, a web page, a research report, an electronic document, an RSS feed, a subscription, an electronic filing, a wire service message, or a press release.

4. The computer-implemented method of claim 1 wherein searching the information item comprises the processor electronically scanning the information item for occurrences of text that matches at least one entity in the list of entities.

5. The computer-implemented method of claim 4 wherein scanning the information item for occurrences of text that matches at least one entity in the list of entities further comprises using phonetic variants of the at least one entity in the list of entities.

6. The computer-implemented method of claim 1 wherein the accuracy confidence level is based at least in part on a location within the information item that the possible reference to at least one of the entities is identified.

7. The computer-implemented method of claim 1 wherein the accuracy confidence level is based at least in part on a frequency that the possible references to at least one of the entities is identified within the information item.

8. The computer-implemented method of claim 1 wherein the accuracy confidence level is based at least in part on a source of the information item.

9. The computer-implemented method of claim 1 wherein the categorization rules consider a source of the information item in determining the category confidence level.

10. The computer-implemented method of claim 1 wherein the categorization rules consider time of receipt of the information item in determining the category confidence level.

11. The computer-implemented method of claim 1 wherein the categorization rules consider historical behaviors of users comprising one or more of websites visited, messages received, messages read or messages forwarded.

12. The computer-implemented method of claim 1 further comprising incorporating a cost function, wherein the cost function describes a user's tolerance for one or more falsely associated information items.

13. The computer-implemented method of claim 12 further comprising using a relevancy engine to calculate a recall probability for a set of information items, the recall probability comprising the probability that an information item within the set of information items is associated with an entity given that the information item is actually about the entity.

14. The computer-implemented method of claim 12 further comprising using a relevancy engine to calculate a precision probability for a set of information items, the precision probability comprising the probability that an information item within the set of information items is associated with an entity given the information item is actually classified according to the entity.

15. The computer-implemented method of claim 12 further comprising adjusting one or more of the categorization rules or the cost function such that the recall probability maintains a minimum value over a set of information items.

16. The computer-implemented method of claim 12 further comprising using a relevancy engine to calculate a relevancy for the information item based at least in part on the cost function.

17. The computer-implemented method of claim 12 wherein the cost function varies among a population of users.

18. The computer-implemented method of claim 12 wherein falsely associated information items comprise information items associated with an entity that do not relate to the entity.

19. The computer-implemented method of claim 12 wherein falsely associated information items comprise information items not associated with an entity that relate to the entity.

20. The computer-implemented method of claim 12 wherein the cost function is generated based on historical behaviors of the user.

21. The computer-implemented method of claim 12 wherein the cost function is generated based on a user-specific interest list.

22. The computer-implemented method of claim 1 further comprising using a categorization engine to associate the information item with a second entity, the second association based at least in part on a defined relationship between the at least one of the entities and the second entity.

23. The computer-implemented method of claim 22 wherein the defined relationship between the at least one of the entities and the second entity is one of a legal relationship, a parent-subsidiary relationship, a licensor-licensee relationship, a business relationship, a customer-supplier relationship or a competitive relationship.

24. A system for classifying information items, the system comprising:
- a database for storing a plurality of entity identifiers;
- a receiver for receiving an information item;
- an entity extractor for (i) searching the information item for references to the entities within the information item, (ii) identifying at least one possible reference to at least one of the entities within the information item, and (iii) calculating an accuracy confidence level that the possible reference to at least one of the entities contains the at least one of the entities; and
- a categorization engine for (i) associating the information item with the at least one of the entities based at least in part on the accuracy confidence level and a set of categorization rules, (ii) calculating a category confidence level that the information item relates to the at least one of the entities, and (iii) associating the information item with the at least one entity based at least in part on the category confidence level.

25. The system of claim 24 further comprising a database for storing the categorization rules.

26. The system of claim 24 further comprising a database for storing a plurality of user-specific cost functions, each cost function describing a user's tolerance for falsely associated information items.

27. The system of claim 26 further comprising a relevancy engine for calculating a relevancy for a specific user and information item based at least in part on the category confidence level and the cost function attributed to the user.

28. The system of claim 24 further comprising a categorization client agent that facilitates the manual association of the information item with the at least one entity.

* * * * *